US005829678A

United States Patent [19]

Hunter et al.

[11] Patent Number: 5,829,678

[45] Date of Patent: Nov. 3, 1998

[54] SELF-CLEANING IRRIGATION REGULATOR VALVE APPARATUS

[75] Inventors: Richard E. Hunter, La Jolla; Peter J. Woytowitz, San Diego, both of Calif.

[73] Assignee: Hunter Industries Incorporated, San Marcos, Calif.

[21] Appl. No.: 667,759

[22] Filed: Jun. 21, 1996

[51] Int. Cl.[6] .................... G06F 19/00

[52] U.S. Cl. .................... 239/70; 239/69; 239/106; 364/143

[58] Field of Search .................... 239/67, 69, 70, 239/104, 106, 112, 570, 583; 364/143, 145

[56] References Cited

U.S. PATENT DOCUMENTS

| | | | |
|---|---|---|---|
| 3,440,434 | 4/1969 | Yates et al. | 239/70 |
| 3,669,352 | 6/1972 | Zaphiris | 239/70 |
| 3,767,124 | 10/1973 | Spencer | 239/542 |
| 3,814,377 | 6/1974 | Todd | 251/145 |
| 3,876,155 | 4/1975 | Ruben | 239/542 |
| 3,908,694 | 9/1975 | Spears | 137/513.3 |
| 4,032,072 | 6/1977 | McElhoe et al. | 239/11 |
| 4,190,206 | 2/1980 | Atkinson et al. | 239/271 |
| 4,244,022 | 1/1981 | Kendall | 239/70 |
| 4,333,490 | 6/1982 | Enter, Sr. | 239/70 |
| 4,427,174 | 1/1984 | Mehoudar | 251/16 |
| 5,184,571 | 2/1993 | Hostetler et al. | 119/72 |
| 5,226,565 | 7/1993 | Hladis et al. | 239/112 |
| 5,299,737 | 4/1994 | McGinnis et al. | 239/112 |
| 5,444,611 | 8/1995 | Woytowitz et al. | 364/145 |

*Primary Examiner*—J. Casimer Jacyna
*Attorney, Agent, or Firm*—Michael H. Jester

[57] ABSTRACT

A cleaning cycle generator for an irrigation system having a programmable irrigation controller. When the irrigation controller terminates an on cycle, the cleaning cycle generator of the present invention will initiate a time delay after which it will turn the sprinklers completely on for a timed period. The sprinklers will then be turned off to complete the remainder of the off cycle. The present invention is particularly advantageous in pressure regulated irrigation valves where particles in the water can become trapped between valve seat surfaces that are in close proximity due to the pressure regulation. Leaking throughout the lengthy off cycle of the irrigation system is prevented by flushing out particles while the valve is in the completely open, unregulated state.

17 Claims, 5 Drawing Sheets

SELF-CLEANING IRRIGATION REGULATOR VALVE APPARATUS

BACKGROUND OF THE INVENTION

1. Field of the Invention

The present invention relates to irrigation control systems, and more particularly to an irrigation controller which generates a cleaning cycle for removing debris from irrigation sprinkler valves.

2. Description of the Related Art

Commercial, industrial, municipal and golf course irrigation systems increasingly rely on reclaimed water as an irrigation water source. This trend has been prompted by an often critical need to conserve water. Alternative water sources include lakes, reservoirs, wells, and the like. However, since water from these sources is often relatively dirty, its use has brought with it an increase in the incidence of clogging of various components of irrigation systems. While the obvious solution is simply to filter the water entering the irrigation system, the cost of such filters, and their maintenance, limits the degree of filtering that is economically feasible.

The problem of clogging in irrigation systems is most acute in areas where water must pass through small spaces. This is the case, for example, in irrigation systems having pressure regulating valves, in drip systems, and in other low flow irrigation configurations.

For example, in irrigation systems having pressure regulating valves, the down stream water pressure, which is directed to the sprinklers, is regulated by a feedback mechanism. Such valves typical have a main diaphragm and a pressure regulating diaphragm. The feedback mechanism directs the outlet water through a passage to the pressure regulating diaphragm, which responds to increasing pressure by closing off a water passageway. This passageway permits water to pass out of the main diaphragm chamber at the upper side of the diaphragm valve. This action increases the pressure on the top of the diaphragm valve causing it to close slightly, thereby restricting the water flow through the valve by a proportional amount.

In many pressure regulating valves the diaphragm may be raised only a few thousands of an inch above the valve seat during regulated operation. Particles larger than this are easily trapped at the diaphragm seat. A serious consequence of this occurrence is that when the valve attempts to turn off the irrigation flow, trapped particles will prevent the diaphragm from seating completely and will cause leaking. Since irrigation systems may be off for extended periods of time, (days or even weeks) even small leaks may result in huge losses of water, over time. Such losses are not only quite expensive, but are also counterproductive to water conservation efforts. They may also result in lost plant material, flooding, and slope erosion.

Consequently, many pressure regulating valves require high levels of costly maintenance to clean out debris. Heretofore, such maintenance has required manual operation to clean out the particles. This adds significantly to the overall maintenance costs of the irrigation system. While the problem of trapped particles exists to some extent even in irrigation systems employing relatively clean potable water, it is more acute when alternative, less pure water sources are used.

SUMMARY OF THE INVENTION

It is therefore, an object of the present invention to provide a system for cleaning out debris from irrigation valves.

It is also an object of the present invention to provide a technique for cleaning out sprinkler valves which is less costly and time consuming than manual cleaning.

It is another object of the present invention to reduce the incidence of clogging of irrigation valves without the use of costly filters which require high levels of maintenance.

It is another object of the present invention to reduce the incidence of leaking in pressure regulating valves, particularly when they are used with water drawn from impure sources such as lakes and reservoirs.

In accordance with the present invention, a system and method for automatically cleaning debris from irrigation systems is provided. The invention requires no manual steps to accomplish the cleaning. It comprises a cleaning cycle programmed into the irrigation system programmable controller. When used on pressure regulating valves, the present invention makes use of the fact that at the beginning of the watering cycle, before pressure has built up at the downstream side of the valve, the diaphragm is generally wide open for a short period of time. While this may purge debris from the valve at the beginning of the watering cycle, it does not prevent debris from causing the valve to leak during the extended period in which the valve is off. This is because during the watering cycle of pressure regulating valves, there can be a very small gap between the diaphragm and its seat. When the valve is turned off, the pressure regulating valve goes from a very slightly open position at the seat (where particles may be trapped), immediately into the closed position, thereby retaining the trapped particles.

In accordance with the teachings of the present invention, each time the regulator valve is shut off, after a brief period of time (to allow all the sprinkler stations to turn off and backpressure to drop), the valve is turned on again for a short cleaning cycle. Since there is no back pressure in the system during the cleaning cycle, the diaphragm will be completely open and the debris will be purged by the water flowing therethrough. The valve is then turned off again to continue the extended off-cycle with the debris removed. In this way leaking is prevented during the off-cycle.

In accordance with the preferred embodiment of the present invention, a system for operating an irrigation system is provided which includes a sprinkler valve and an irrigation controller for selectively turning on and off the sprinkler valve. The irrigation controller includes a controllable timer for determining the on and off times of each irrigation cycle for the sprinkler valve. A valve cleaning cycle generator is coupled to the irrigation controller for generating a cleaning cycle by turning the sprinkler valves on for a predetermined period of time after the irrigation controller turns it off. During this cleaning cycle, debris trapped in the sprinkler valve station is flushed out.

In accordance with another preferred embodiment of the present invention a method is provided for operating an irrigation system. The system includes at least one sprinkler valve and an irrigation controller for selectively turning on and off the sprinkler valve. The method includes the steps of turning the sprinkler valve on for an irrigation cycle and turning the sprinkler valve off when a predetermined irrigation time has elapsed. The sprinkler valve is then turned back on again for a predetermined cleaning time and the sprinkler valve is turned off again when the predetermined cleaning time has elapsed.

Thus, the present invention cleans debris from sprinkler valves which would otherwise remain trapped and result in leaking during the entire off cycle of the sprinkler system. The operation of the invention is entirely automatic and does not require manual operation. The invention reduces the need for manual maintenance to clean clogged valves. Furthermore, the present invention avoids the use of expensive and high maintenance filtering as a way to prevent clogging. Also, the invention results in significant savings in water losses by reducing to leaking during the irrigation off cycle.

BRIEF DESCRIPTION OF THE DRAWINGS

The nature, object and advantages of the invention will become apparent to those skilled in the art after considering the following detailed description in connection with the accompanying drawings, in which like reference numerals designate like parts throughout, wherein.

DETAILED DESCRIPTION OF THE PREFERRED EMBODIMENTS

The present invention provides a system and method for automatically cleaning debris from irrigation system valves. The invention generates a cleaning cycle automatically at the end of each irrigation on cycle. This prevents the valve from leaking while it is off. Three embodiments of the system of the present invention arc disclosed including hardware, firmware, and software embodiments.

While the problem of trapped debris in irrigation systems is most prominent in irrigation systems employing pressure regulating valves, it will be appreciated that the techniques of the present invention may be advantageously used with other kinds of valves which experience clogging problems such as low flow systems, drip systems and others.

Figure 1:
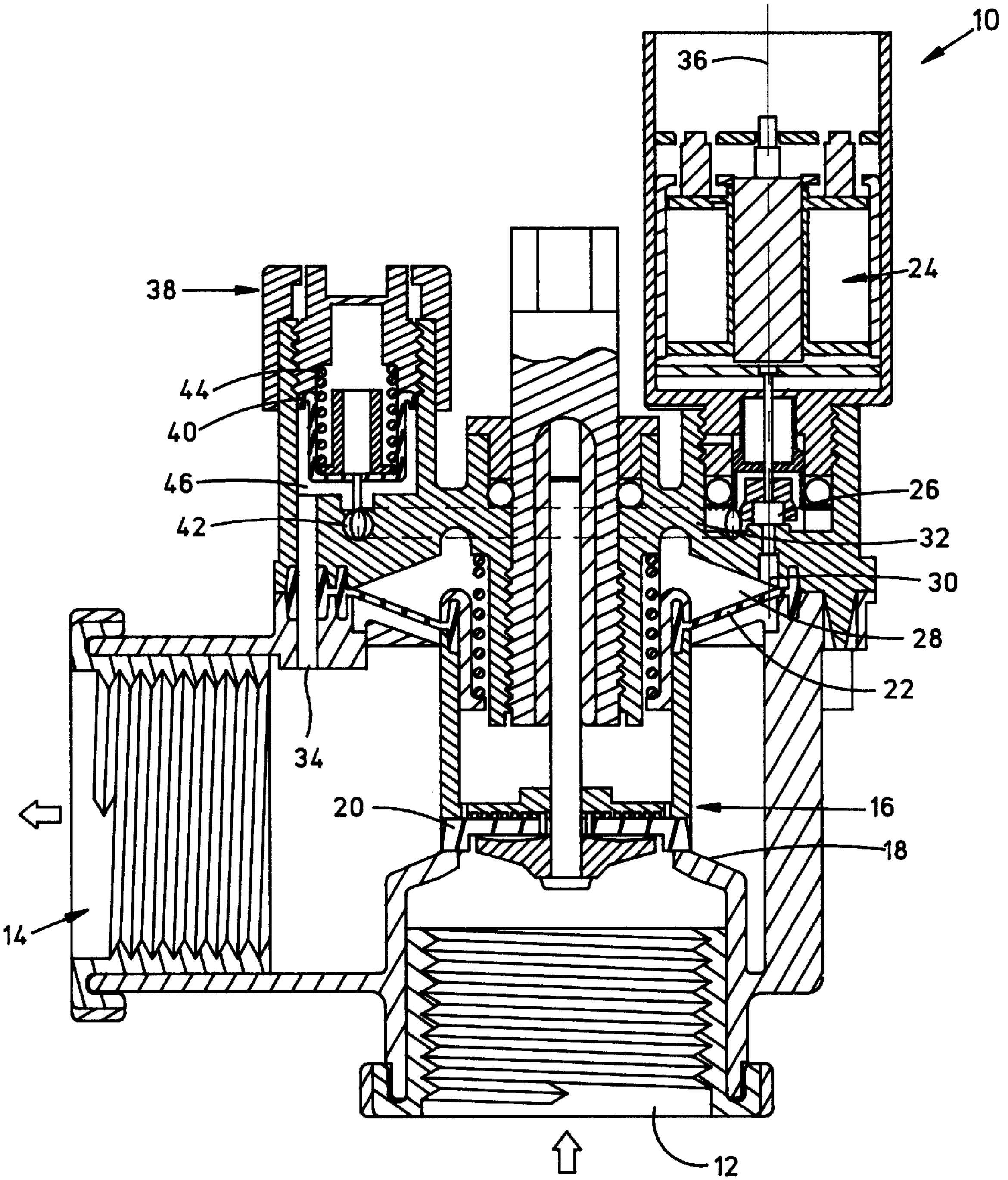
FIG. 1 (Prior Art)
FIG. 1 is an illustration of a pressure regulating diaphragm-type irrigation valve in accordance with the prior art.

Referring now to FIG. 1, there is illustrated an exemplary prior art pressure regulating valve of a type commonly used in irrigation systems. This pressure regulating valve 10 is a diaphragm-type valve which includes an inlet port 12 for receiving irrigation water and an outlet port 14 for conveying water to one or more sprinkler valve stations. The pressure regulating valve 10 controls the flow of water from the inlet port to the outlet port 14 by means of a diaphragm assembly 16 which is raised or lowered from a valve seat 18 to turn the valve on and off. As illustrated in FIG. 1, the valve is in the OFF position, since a diaphragm seat 20 is in contact with the valve seat 18.

The diaphragm assembly 16 includes a diaphragm 22 in the form of an annular resilient member which permits up and down motion of the diaphragm assembly 16. The pressure regulating valve 10 also includes a solenoid 24 which is operable by means of an electrical signal to actuate a solenoid piston 26 to move between raised and lowered positions. Above diaphragm 22, there is a diaphragm chamber 28 into which water from the inlet port 12 flows through a metered pathway (not illustrated). A diaphragm outlet pathway 30 permits water to flow from the diaphragm chamber to the solenoid piston 26 and, when the solenoid is in the upward, or open, position, to a crossover pathway 32. Crossover pathway 32 is also connected to an outlet pathway 34 which permits water to flow to the outlet port 14.

In operation, when the solenoid piston 26 is in the down position, no water is allowed to flow out of the diaphragm chamber 28 through the diaphragm outlet pathway 30. As a result, pressure in the diaphragm chamber builds up to equal the pressure in the inlet port 12. However, the area above the diaphragm, which is affected by the pressure in the diagram chamber, is greater than the area below the diaphragm, which is affected by the pressure in the inlet port. As a consequence, there is a resultant downward force on the diaphragm which causes it to close on the seat 18. The valve 10 is then in the OFF position and no water can flow from the inlet port 12 to the outlet port 14.

When the solenoid 24 is energized by a signal from an irrigation controller (not shown) carried on an electrical wire 36, the solenoid piston 26 moves up. This permits water to flow out of the diaphragm chamber 28 and then to the outlet port 14 by way of the diaphragm outlet pathway 30, crossover pathway 32 and outlet pathway 34. As a result, pressure in the diaphragm chamber 28 will decrease enough so that the pressure at the inlet port is higher by an amount sufficient to raise the diaphragm off the seat 18. This allows water to flow from the inlet port past valve seat 18 and directly into the outlet port 14.

It will be appreciated that in many irrigation systems, it is desirable to control the water pressure applied to the irrigation sprinkler units. This is accomplished by means of a pressure regulator unit 38, which includes a pressure regulating diaphragm 40, that is connected, on its bottom side, to a pressure regulating piston 42. The pressure regulating piston 42 is disposed in the crossover pathway 32 near the outlet pathway 34. A spring 44 normally holds the diaphragm 40 in the downward position with a predetermined downward force. In this position, crossover pathway 32 is open to outlet pathway 34. The outlet pathway 34 is connected to a pressure regulating chamber 46. As a result, pressure in the outlet port 14 is also present in the outlet pathway 34 and in the pressure regulating chamber 46. This will cause the pressure regulating diaphragm 40 to raise somewhat, until the upward force on the pressure regulating diaphragm 50, due to the spring 44, is exceeded.

This will raise the pressure regulating piston 42 in a way that partially restricts the flow of water through crossover pathway 32. By restricting this flow the pressure in the main diaphragm 28 will increase. That is, since less water can flow from the inlet port 12 to the diaphragm chamber 28, and out of the diaphragm chamber into diaphragm outlet pathway 34 and into crossover pathway 32, there will be a net increase in the pressure within the diaphragm chamber 28. This will result in greater force at the top of the diaphragm causing the diaphragm 22 to lower somewhat when the valve is still in the on position. As a result, the space between valve seat 18 and diaphragm contact 20 will be reduced. This restricts the volume of water passing from the inlet port 12, past the valve seat 18, and into the outlet port 14. The result is a reduction in the pressure in the outlet port 14, and thereby a reduction in pressure at the sprinkler units.

Figure 2:
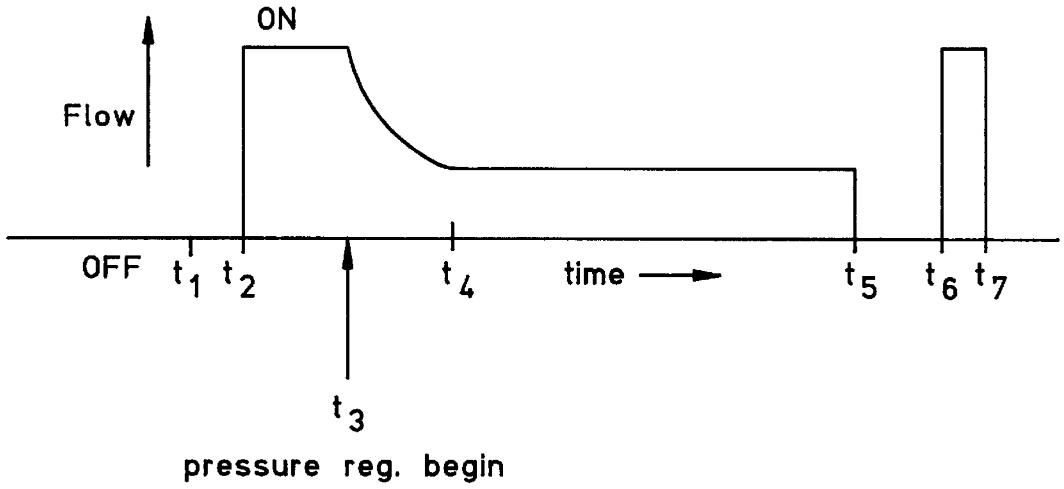
FIG. 2 is a graph of the flow in an irrigation system during irrigation and cleaning cycles in accordance with the present invention.

Referring now to FIG. 2 there is illustrated a graph of outlet port flow versus time for the irrigation and cleaning cycles in accordance with the present invention. In more detail, the graph in FIG. 2 illustrates the flow at the outlet port 14 of the pressure regulating valve 10 shown in FIG. 1. At time $t_1$ the flow and pressure is zero at outlet port 14 because the solenoid piston 26 is in the down position, which results in the diaphragm 16 also being in the down position. This closes off valve seat 18 so that no water is flowing into the outlet port 14. At time $t_2$ an electrical signal from an irrigation controller activates solenoid 24 to turn the pressure regulating valve 10 ON. Almost immediately, the flow at the outlet port 14 reaches a maximum level. After the downstream pipes are filled, pressure increases. At this point, $t_3$, the pressure regulating diaphragm 40, will sense the increased pressure and will partially close off crossover pathway 32 which decreases flow through the valve until a desired regulated pressure level is achieved at time $t_4$. It will be appreciated that this regulated pressure level can be adjusted, for example, by increasing or decreasing the tension on spring 44 in a manner known in the art.

When the irrigation cycle is complete, the irrigation controller will signal the solenoid 24 causing it to close the crossover pathway 32 which results in the diaphragm 16 lowering and preventing water from flowing into the outlet port, at time $t_5$. It is notable that during the regulated on time between $t_4$ and $t_5$ the distance between valve seat 18 and diaphragm seat 20 can be quite small, for example, it may be only 0.001 inches. During this period, it is quite likely that dirt particles may become lodged between these two surfaces in this small opening. This is a more common occurrence with the use of non-potable water such as water from lakes and reservoirs. Turning off the valve at $t_5$ will simply result in these particles being lodged more tightly between surfaces 18 and 20. This will almost certainly result in leaking during the off cycle of the irrigation controller. During an extended off cycle this could result in a significant loss of water, since the off cycle may last days or weeks.

At time $t_6$, in accordance with the invention, a clean cycle generator, or other means, signals the solenoid to raise solenoid piston 26, thereby opening the valve and allowing flow to rapidly reach a maximum level. It is to be noted that the distance between time $t_5$ and time $t_6$ must be sufficiently long to permit the valve to attempt to close. The length of this period will depend on the flow, pressure, and other parameters. It will typically be one to twenty seconds long. If the valve 10 is turned back on too soon then there will still be significant enough back pressure at outlet port 14 to inhibit the full flow condition (valve wide open) required for cleaning. In any event, at $t_6$ the regulating valve 10 is again opened and maximum flow is rapidly reached. At this point the distance between seats 18 and 20 is much larger than it was during the regulated on cycle (between $t_4$ and $t_5$). As a result, particles caught between these surfaces will, in all likelihood, be flushed out by the passage of water at high flow. This period of flushing continues until $t_7$, which is typically in the range of one to ten seconds long. Note that $t_7$, is reached and the valve 10 is closed again before any pressure regulation, and reduced pressure, occurs. Thus, during the cleaning cycle there is no opportunity for particles to become lodged during a period of time when the seats 18 and 20 are close to each other in a regulated situation. After $t_7$, the flushed pressure regulating valve 10 remains in the OFF position for the remainder of the OFF cycle.

Figure 3:
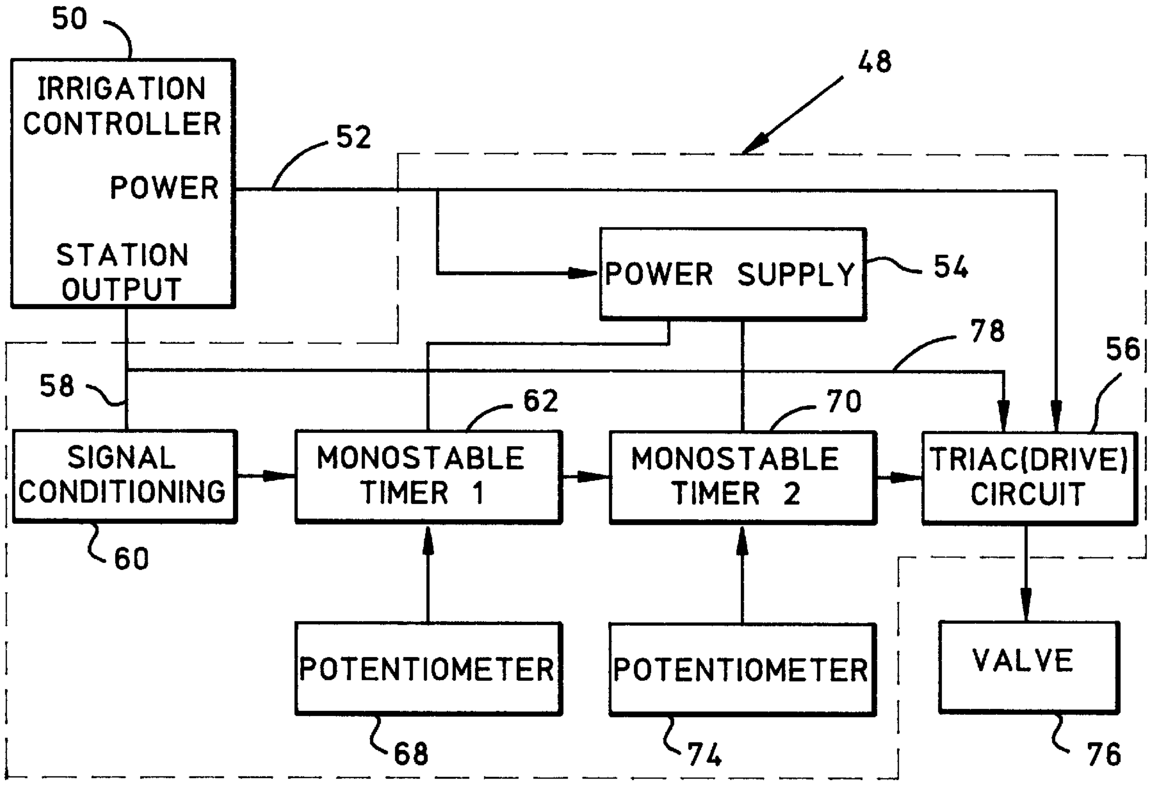
FIG. 3 is a block diagram of a cleaning cycle generator for a single station irrigation controller in accordance with a first embodiment of the present invention.

Referring now to FIG. 3 there is illustrated a block diagram of a first preferred embodiment of the present invention. An irrigation valve cleaning cycle generator 48 is coupled to a conventional irrigation controller 50. Irrigation controller 50 may comprise, for example, a microcomputer controlled irrigation controller such as the one disclosed in U.S. Pat. No. 5,444,611 issued to Hunter Industries, Inc. of San Marcos, Calif., which is herein incorporated by reference. A power output lead 52 from the irrigation controller 50 is fed to the cleaning cycle generator 48 where it is directed both to a power supply unit 54 and to a triac drive circuit 56. Also, a station output signal from the irrigation controller 50 is fed on line 58 to both a signal conditioning unit 60 and to the triac drive circuit 56. The signal conditioning unit 60 is a conventional circuit comprising resistors and capacitors which converts the twenty-four volt AC signal from the irrigation controller 50 into a level that is compatible with the rest of the circuits in the cleaning cycle generator 48. For example, this may comprise a level of plus five volts.

The output of the signal conditioning unit 60 is fed to a monostable timer 62, which is triggered by the falling edge of its input. This occurs when the station output 58 shuts off, which corresponds to point $t_5$ in FIG. 2. In the preferred embodiment monostable timer 62 is an integrated circuit No. MC14538 available from Motorola semiconductor. To illustrate this process in more detail, reference is made to FIG. 4 which is a timing diagram for the various components shown in FIG. 3. The signal conditioning output 60 will be high at the point in time labeled 64 in the diagram. At point 66 the irrigation controller station output 58 turns off and so does the signal conditioning unit output. Since monostable timer 62 is triggered by the falling edge of the signal conditioning unit output, it now outputs a one-shot pulse with a length determined by a setting on a potentiometer 68. Typically, this pulse will be between 1–20 seconds. This represents the delay between the time when the controller valve shuts off ($t_5$ in FIG. 2), and when the cleaning cycle generator 48 turns it back on ($t_6$).

Figure 4:
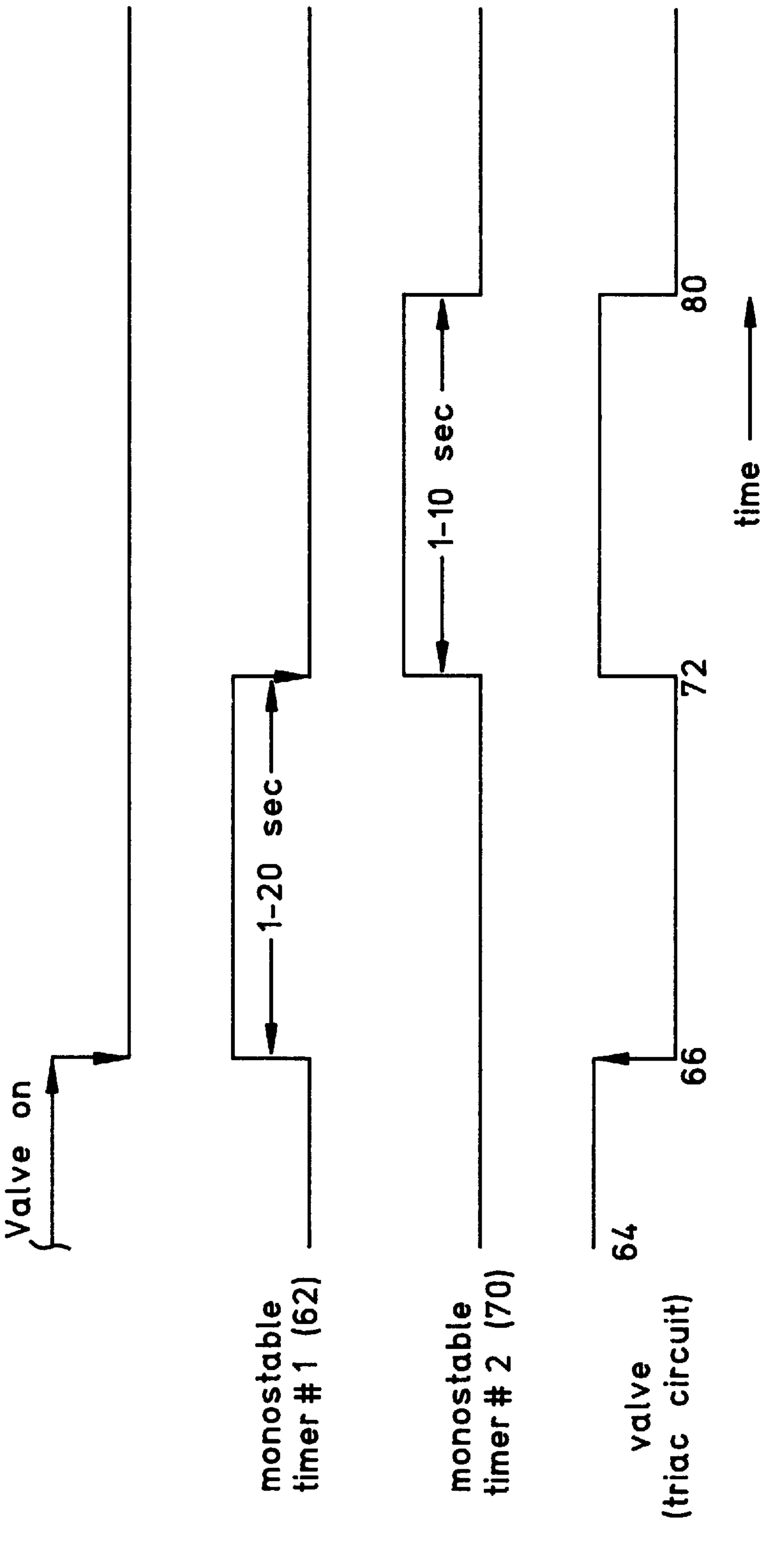
FIG. 4 is a timing diagram of the operation of selected components of the present invention shown in FIG. 3.

A second monostable timer 70 is triggered by the falling edge of the first monostable timer 62 output pulse. This occurs at time 72, shown in FIG. 4, which shows the second monostable timer 70 going high at the same time that the first monostable goes low. The second monostable timer 70, in the preferred embodiment, is a MC14538 available from Motorola. The output of the second monostable timer 70 triggers the triac drive circuit 56 which energizes the valve 10 a second time. This occurs at time $t_6$ in FIG. 2. This will energize valve 76 which will comprise a conventional irrigation valve such as valve 10 shown in FIG. 1. This event is also illustrated in FIG. 4 by the triac circuit line going high. The length of the second monostable timer 70 output is settable via a second potentiometer 74. This time will typically be between 1–10 seconds. Both monostable timer circuits 62 and 70 are powered by the power supply circuit 54. Note also that the station output of the controller 58 is also fed along line 78 to the triac drive circuit 56 to permit it to energize the valve each time the controller station output 58 is energized. Finally, as shown in FIG. 4, when the monostable timer signal goes low at point 80, the valve 76 will also turn off, completing the cleaning cycle.

Figure 5:
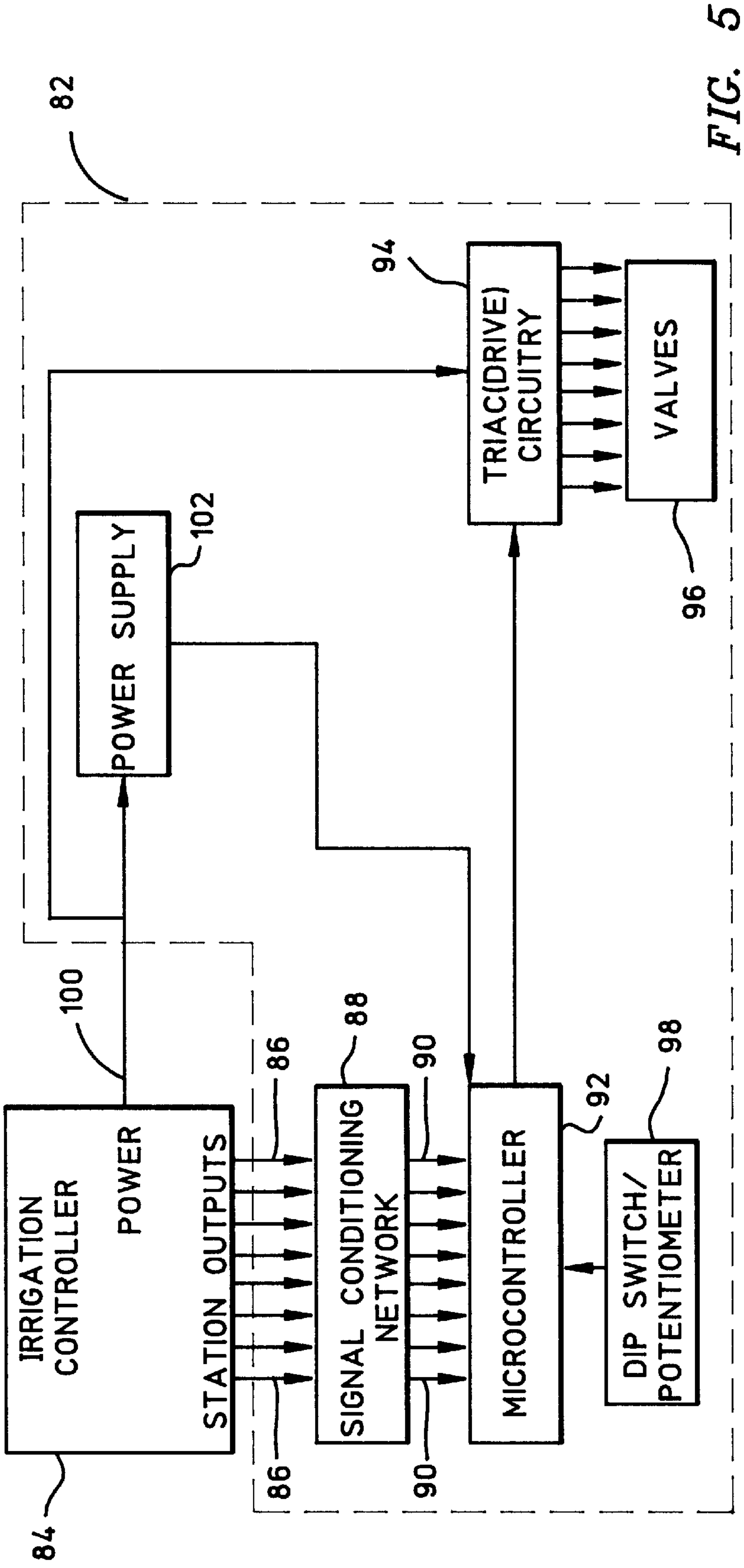
FIG. 5 is a diagram of a cleaning cycle generator for a multiple station irrigation controller in accordance with the second embodiment of the present invention.

The embodiment of the cleaning cycle generator 48 shown in FIG. 3 is a cost effective solution for single station irrigation control systems. For multiple station systems, the embodiment depicted in FIG. 5 is preferred. In this system, a cleaning cycle generator 82 is connected to a conventional irrigation controller 84 which has multiple station outputs. This irrigation controller may comprise, for example, a controller similar to the one shown in U.S. Pat. No. 5,444, 611, which was previously incorporated by reference. Each of the station outputs 86 are fed to a signal conditioning network 88, which serves a similar function as signal conditioning network 60 in FIG. 3. That is, it converts the twenty-four volt AC signals from the irrigation controller into logic level (zero to five volt) signals compatible with the subsequent circuitry.

The signal conditioning network 88 includes a plurality of outputs 90, each of which are fed to a microcontroller 92. Microcontroller 92 comprises a model No. PIC16C54 available from Microchip Technology Inc., of Chandler, Ariz. The microcontroller 92 scans these outputs when it detects an active output and triggers the appropriate triac in the triac drive circuit 94 to energize the correct irrigation valve 96. Valves 96 may comprise, for example, a plurality of pressure regulating valves, similar to valve 10 shown in FIG. 1. When that station output shuts off, the microcontroller 92 checks a potentiometer 98 to determine the appropriate delay. Potentiometer 98 may alternatively comprise a DIP switch. The microcontroller 92 then shuts the valve down via the triac drive circuit 94, waits the appropriate delay, and then reenergizes the irrigation valve 96 momentarily. The length of time that the valve is reenergized during the cleaning cycle is also settable via the potentiometer 98. Power for the cleaning cycle generator 82 is supplied through power output line 100 from the irrigation controller 84, which is fed to a power supply 102, and also to the triac drive circuit 94. The output of the power supply 102 is then provided at the appropriate level to the microcontroller 92.

Figure 6:
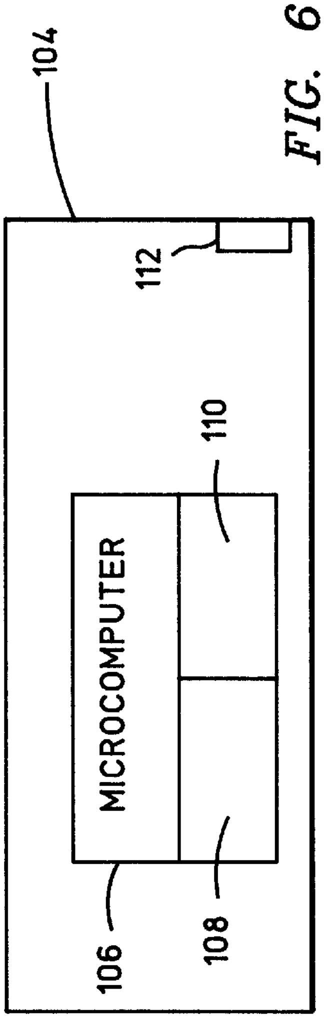
FIG. 6 is a block diagram of an irrigation system having a software implementation of the cleaning cycle generator in accordance of the present invention.

Referring now to FIG. 6, there is illustrated a third embodiment of the present invention. In this embodiment, an irrigation controller 104 includes a microcomputer 106 having a conventional irrigation program 108 stored therein. The irrigation controller may, for example, may be based on the irrigation controller disclosed in U.S. Pat. No. 5,444,611, with modifications including those shown in FIG. 6. The irrigation program 108 may comprise, for example, a program similar to the one described in the incorporated by reference U.S. Pat. No. 5,444,611. Irrigation program 108 is used to control the normal irrigation timing schedule for the irrigation system connected to irrigation controller 104.

A cleaning cycle program 110 is also stored in the microcomputer 106. This program implements in software the operations of the cleaning cycle generators 48 and 82 discussed above with regard to FIGS. 3 and 5. It will also be appreciated that programs 110 and 108 may either be separate programs or may be combined into a single program. In addition, irrigation controller 104 will include a user input 112 which is connected to the microcomputer 106 to permit the user to set the two time periods relevant to the cleaning cycle. That is, the user input 112 will permit the setting of the time between $t_5$ and $t_6$, and between $t_6$ and $t_7$ in FIG. 4. User input 112 may comprise a DIP switch, a potentiometer as shown in FIG. 5, or a keypad, such as the one shown in U.S. Pat. No. 5,444,611.

Figure 7:
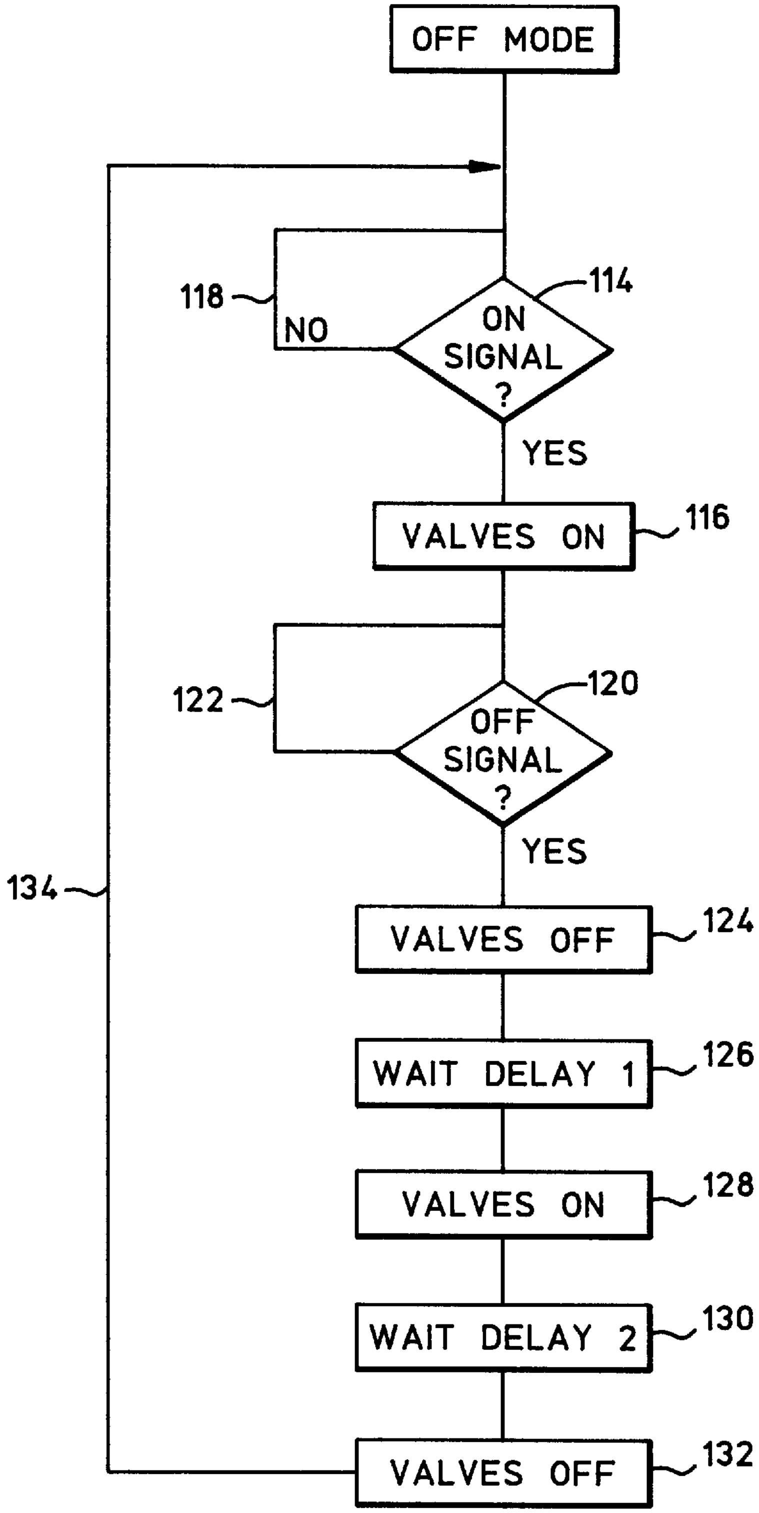
FIG. 7 is a flowchart of the cleaning cycle process of the present invention.

Referring now to FIG. 7, a flowchart of the steps implemented by the cleaning cycle program 110 in FIG. 6 is shown. This flowchart 112 begins with the irrigation controller in the normal OFF mode. When a signal comes from the scheduling program 108 to command the valves to turn on, step 114 will detect this signal and turn the irrigation valves ON, in step 116. This is the normal irrigation ON cycle. If step 114 does not detect the signal from the irrigation controller to energize the irrigation valve, the program 110 proceeds through a loop 118 and back to step 114 to again check for the ON signal.

With the irrigation valve on in step 116, step 120 will determine whether an OFF signal has been received from the irrigation controller. For example, this signal may comprise simply the station output being turned off. If not, the program proceeds through loop 122 and back to step 120, to again check for the off signal. If the OFF signal is detected in step 120 then the valves are turned off, in step 124. This triggers a timer in the program to wait for a first period of time, in step 126, which corresponds to the time between $t_5$ and $t_6$ in FIG. 2. After this time has passed, the irrigation controller will turn the valves back on, in step 128. This will trigger a second timer to wait a second delay period, in step 130. This period corresponds to the time between $t_6$ and $t_7$. Once this period is over the irrigation controller will turn the valves back off, in step 132. At this point, the program will proceed along loop 134 back to the normal off mode until the normal scheduled on time occurs again.

The cleaning cycle generator of the present invention in its various embodiments is useful in a wide variety of irrigation systems. It is particularly useful in pressure regulated systems where particles get trapped between small spaces at the valve seat opening. With the present invention the valve is completely open during the cleaning cycle to flush out debris. The present invention will eliminate costly and time consuming manual cleaning maintenance operations and will permit the use of relatively dirty water from alternative sources such as lakes and streams without requiring expensive and high maintenance filtering systems to remove particles from the water.

While there have been shown what are presently considered to the preferred embodiments of the invention, it will be apparent to those skilled in the art that various changes and modifications can be made herein without departing from the scope of the invention as defined by the appended claims.

We claim:

1. A system for operating an irrigation system, comprising:

- a sprinkler valve operable between selected ON and OFF conditions to open and close the valve;
- an irrigation controller connected to the sprinkler valve for turning the sprinkler valve ON and OFF during an irrigation cycle of the sprinkler valve; and
- a cleaning cycle generator connected to the irrigation controller for generating a cleaning cycle by turning the sprinkler valve ON for a predetermined period of time after the irrigation controller has turned OFF, whereby debris trapped in the sprinkler valve will be flushed out.

2. The system of claim 1 wherein the valve cleaning cycle generator delays for a wait period after the irrigation controller has turned the sprinkler valve OFF before turning the sprinkler valve back ON for the cleaning cycle.

3. The system of claim 2 further comprising user controllable timer for adjusting the length of the wait period, whereby the wait period can accommodate a closing speed of the sprinkler valve.

4. The system of claim 2 wherein the cleaning cycle generator includes a first adjustable timer responsive to said OFF signal for determining the wait period.

5. The system of claim 4 wherein the cleaning cycle generator includes a second adjustable timer responsive to the first adjustable timer for determining the predetermined ON time for the cleaning cycle.

6. The system of claim 5 wherein the first and second adjustable timers each comprise monostable timers coupled to user input means for adjusting the length of the wait period and the predetermined ON period, respectively.

7. The system of claim 2 further comprising a plurality of sprinkler valves and wherein the irrigation controller generates a plurality of command signals, each independently controlling a corresponding sprinkler valve;

the cleaning cycle generator further comprising user input means for setting the predetermined ON period of time and the wait time; and microcontroller responsive to the command signals and to the user input unit means for generating the cleaning cycle, including a wait period and a predetermined ON period of time for each sprinkler valve.

8. The system of claim 1 wherein said irrigation controller is a programmable controller containing a program determining the timing and duration of the ON and OFF times, and the valve cleaning cycle generator comprises a software component of the program.

9. The system of claim 1 wherein the irrigation controller generates a command signal indicating that the sprinkler valve should turn ON and OFF, and wherein the valve cleaning cycle generator receives the command signal and initiates a cleaning cycle in response to OFF command signal.

10. The system of claim 1 wherein the sprinkler valve includes a pressure regulator, and wherein the sprinkler valve is partly closed during the irrigation cycle due to pressure regulation, and wherein the sprinkler valve is fully open during the cleaning cycle, whereby particles trapped by the partly closed valve are flushed out during the cleaning cycle.

11. A method for cleaning debris from an irrigation system having at least one sprinkler valve and an irrigation controller for selectively turning the sprinkler valve on and off, the method comprising the steps of:

turning the sprinkler valve ON for an irrigation cycle;

turning the sprinkler valve OFF when the irrigation cycle is over;

turning the sprinkler valve back ON for a predetermined cleaning time, whereby debris in the sprinkler valve is flushed out; and turning the sprinkler valve off when the predetermined cleaning time has elapsed.

12. The method of claim 11 further comprising the step of delaying initiation of the step of turning the sprinkler valve back ON by a wait period, whereby the cleaning time does not begin until the sprinkler valve has closed.

13. The method of claim 12 further comprising the steps of determining the length of waiting period as a function of the closing time of the sprinkler valve.

14. The method of claim 11 further comprising the step of regulating the pressure in the sprinkler by partially closing the sprinkler valve during the irrigation cycle, and fully opening the valve during the step of turning the sprinkler back ON.

15. A valve cleaning cycle generator operating on an irrigation system having a sprinkler valve and an irrigation controller that generates output signals for turning the sprinkler valve ON and OFF during an irrigation cycle of the sprinkler valve, the valve cleaning cycle generator comprising:

a sprinkler drive circuit connected to receive an irrigation controller output signal and turn the sprinkler valve ON in response to an irrigation control ON signal;

a signal conditioning circuit connected to receive the irrigation output signals and generate an output signal having a second voltage level;

a first timer circuit connected to receive the signal conditioning output signal and produce an output signal after a predetermined delay from the time of receipt of a signal conditioning output signifying a sprinkler OFF command;

a second timer circuit connected to receive the first timer circuit output signal and transmit a sprinkler ON output signal immediately upon receiving the first timer circuit output; and terminating the sprinkler on signal after a predetermined on time, wherein the drive circuit also receives the second timer circuit sprinkler on output signal and turns on a sprinkler valve in response thereto, whereby after each time the irrigation controller generates an off signal, the sprinkler goes off and back on after the predetermined delay period for a predetermined on period.

16. The valve cleaning cycle generator of claim 15 further comprising adjustable delay unit coupled to the first timer circuit for modifying the length of said predetermined delay.

17. The valve cleaning cycle generator of claim 15 further comprising adjustable timer circuit coupled to the second timer circuit for modifying the predetermined on time.

* * * * *